United States Patent Office 3,123,538
Patented Mar. 3, 1964

---

3,123,538
METHOD FOR CULTIVATING LACTOBACILLI
Minoru Shirota, 49 Yoshida-Shimooji, Sakyo-ku, Kyoto, Japan; Noboru Nagamatsu, 11 Kuji, Kawasaki, Japan; and Yoshiro Takechi, 436–1 Fujiookumachi, Otsu, Japan
No Drawing. Filed Apr. 17, 1961, Ser. No. 103,195
18 Claims. (Cl. 195—48)

The present invention relates to a method of cultivating Lactobacilli which comprises incorporating a single-cell green alga, e.g. Chlorella or the material extracted therefrom which promotes the growth of Lactobacilli, into a milk-containing culture medium or into sugar-containing bouillon medium.

The amount of photosynthetic products per unit area of Chlorella or Scenedesmus of single-cell green algae, is extremely high when compared to other kinds of plants. For example, the amount of produced protein is 53 times that of a combination of two crops of rice and wheat produced in a year, the amount of produced fat is 48 times that of a combination of two crops of soy-beans and barley produced in a year, and the amount of produced carbohydrate is 3 times the combination of two crops of rice and wheat produced in a year. For these reasons, green algae have been extensively studied as a key to the solution for food problems in the future.

The instant inventors have discovered that Chlorella and the like contain materials which remarkably promote the growth of Lactobacilli and also have discovered that Chlorella itself can be used as a food. The former is demonstrated by the following: Dry Chlorella is added in varying amounts to a culturing medium containing 8% powdered skim milk and 3% dextrose which is sterilized by heating. After sterilization, *Lactobacillus acidophilus* is inoculated into the medium, and cultured at 37° C., after which the composition is titrated to find the concentration of lactic acid produced each day. In the following table the results are tabulated:

| Cultivating, hours | 24 hrs. | 48 hrs. | 72 hrs. | 96 hrs. | 144 hrs. |
|---|---|---|---|---|---|
| Concentration of Chlorella in percent: | | | | | |
| 0 | 0.07 | 0.53 | 1.02 | 1.23 | 1.50 |
| 0.25 | 0.27 | 1.18 | 1.54 | 1.75 | 2.07 |
| 0.5 | 0.49 | 1.36 | 1.76 | 1.93 | 2.25 |
| 1.0 | 0.53 | 1.52 | 1.85 | 2.02 | 2.36 |
| 2.0 | 0.53 | 1.66 | 1.95 | 2.15 | 2.48 |

The numbers in the above table were arrived at by subtracting the amount of acidity which existed in the medium before inoculation from the amount of acidity after inoculation. The data in said table shows that the medium containing 0.5 to 2% of dry Chlorella powder produced much more Lactobacilli in comparison with the medium which contains no Chlorella, that is, 7 times more after 24 hours, 3 times more after 48 hours and 1.8 times more after 72 hours. The table also shows that the medium containing 1% of Chlorella produces as much lactic acid in 48 hours as the medium with no Chlorella produces in 144 hours. Since the media containing Chlorella have a large amount of precipitated Chlorella, they, therefore, are colored green and also are bitter and have a bad odor. Thus, said media cannot, practically, be used as food.

However, if the material contained in the Chlorella which assists in the promotion of productivity of the Lactobacilli could be extracted and used in place of the Chlorella, then the defects of bitterness and odor caused by the Chlorella could be alleviated and the media could be used as animal or human food. This point was studied in the experiment below.

Chlorella was immersed in the following solutions: warm water, N/20 sodium bicarbonate solution, N/50 caustic soda solution and N/20 hydrochloric acid solution. Each solution was filtered and the alga was separated from the filtrate. Each filtrate was neutralized and powdered skim milk and glucose was added thereto to make media. Said media were sterilized by heating and then inoculated with Lactobacilli. It was found by titration that the most lactic acid was obtained from the hydrochloric acid, medium then came the sodium bicarbonate medium, the caustic acid medium and the warm water medium, in that order. When the alga is immersed in water, sodium bicarbonate or in caustic soda, the alga itself expands and filtration becomes difficult, but in the case of hydrochloric acid, filtration is easy and no putrefaction occurs during immersion. In the case of immersion in the alkaline solution, the Mg of the chlorophyll is replaced with, for example, Na and becomes soluble. This makes the filtrate a green color. Since the material that promotes the growth of Lactobacilli is not soluble in alcohol, the residue obtained when chlorophyll was extracted by methanol or the like is also colored green. Acids which can be used to immerse the alga can be either organic or inorganic.

In the case when N/20 strength hydrochloric acid is used for immersion, 91% of the effective components of the alga are obtained in the first leaching. When the residue is leached a second time, 5.2% of the effective components remain and after leaching 5 times, 4.2% of the effective component is left. In other words, after the first immersion with hydrochloric acid almost all of the effective component is extracted.

When the filtrate produced in the above designated manner is added to a milk-medium, and Lactobacilli is cultivated therein, the medium has less bitterness and odor than the cultivating medium obtained when alga itself is used. However, enough bitterness and odor remains so that the media is not suitable for drinking.

When the pH of the dilute hydrochloric acid filtrate obtained from Chlorella is changed by the addition of caustic soda, and activated carbon is added, the effective component is absorbed by the activated carbon at various rates depending upon the pH value and the percentage of activated carbon. The numbers in the table below show the percentage of absorbed effective component by the activated carbon in comparison with the total amount of the filtrate.

| pH | 1.8 | 3 | 4 | 5 | 6 | 7 | 9 |
|---|---|---|---|---|---|---|---|
| Activated carbon in percent: | | | | | | | |
| 0.1 | 5 | 34 | 41 | 65 | 86 | 94 | 97 |
| 0.2 | 26 | 45 | 65 | 78 | 90 | 97 | 99 |
| 0.5 | 45 | 53 | 67 | 84 | 95 | 98 | 100 |
| 1.0 | 53 | 48 | 68 | 89 | 96 | 99 | 100 |

As is clear from the above table the effective component is not readily absorbed by the activated carbon when the pH is low, however, when the pH is raised the amount of effective component absorbed is also raised. When the pH value reaches 9 almost all of the component in the filtrate is absorbed by a very small amount of activated carbon. Also the nature of the filtrate is changed remarkably by adding a small amount of activated carbon. For example, when the pH is between 1.8 and 9 and activated carbon is added in an amount between 0.1 to 0.2%, the color of the filtrate becomes very light and the fish like odor is diminished. When 0.5% of activated carbon is added the color of the filtrate disappears and the odor is hardly discernible. The effective component absorbed by activated carbon is released upon treatment of hydrochloric acid. If the filtrate is then filtered and neutralized the effective component is obtained in the pure state.

From the above description two methods for refining the hydrochloric filtrate are brought to mind. One method is to add 0.2% to 0.5% of activated carbon to the mixture of Chlorella and hydrochloric acid which has a pH value of about 2, and using the filtrate thereof. In contrast thereto, the other method would be to add caustic soda to the filtrate to make its pH from 6 to 9 and then add 0.1 to 0.2% of activated carbon whereby the activated carbon absorbs the effective component. Said carbon is then treated with dilute hydrochloric acid so that the effective component is released therefrom and the carbon is then separated by filtration.

The effective component promotes the growth of any kind of Lactobacilli which, of course, increases the production of lactic acid. The following table shows the amount of lactic acid produced by the two kinds of cultivating media. One kind of media consists of 8% powdered skim milk and 3% glucose, while the other contains the Chlorella filtrate of dilute hydrochloric acid, which is equivalent to 1% Chlorella, as well as the constituents of the first. Various types of Lactobacilli are inoculated therein and the amount of lactic acid is determined by titration. The numbers in the table were arrived at by subtracting the amount of acidity which exists in the medium before inoculation from the amount of acidity after inoculation.

| Species | Presence of Chlorella | 24 hrs. | 48 hrs. | 96 hrs. | 144 hrs. |
|---|---|---|---|---|---|
| | | Percent | Percent | Percent | Percent |
| Lactobacillus casei | none | 0.09 | 0.47 | 0.97 | 1.30 |
| | yes | 0.67 | 1.42 | 2.01 | 2.39 |
| Lactobacillus balgaricus | none | 0.27 | 1.08 | 1.51 | 1.76 |
| | yes | 0.99 | 1.55 | 2.06 | 2.31 |
| Lactobacillus acidophilus strain—A | none | 0.07 | 0.23 | 0.61 | 0.94 |
| | yes | 0.54 | 1.18 | 1.69 | 1.98 |
| Lactobacillus acidophilus strain—B | none | 0.04 | 0.27 | 0.83 | 1.02 |
| | yes | 0.42 | 1.10 | 1.62 | 1.87 |
| Lactobacillus acidophilus strain—C | none | 0.05 | 0.47 | 1.10 | 1.40 |
| | yes | 0.75 | 1.44 | 1.94 | 2.18 |
| Streptococcus faecalis | none | 0.13 | 0.23 | 0.38 | 0.47 |
| | yes | 0.38 | 0.46 | 0.50 | 0.59 |
| Streptococcus lactis | none | 0.14 | 0.27 | 0.41 | 0.43 |
| | yes | 0.40 | 0.50 | 0.59 | 0.63 |

From the above table, it is apparent that the results vary in accordance with the particular type of bacilli used, however though the results may vary it is clear that the presence of Chlorella promotes the production of lactic acid no matter which bacilli is used.

By using said growth promoting material obtained from Chlorella, the production of lactic acid is greatly increased so that it may be used in industry. Further, the cultivation hours for living bacilli in the production of Lactobacilli-medicine can be reduced and also the amount of bacilli which is obtained from each unit volume of cultivating medium can be remarkably increased. In the production of Lactobacilli drinks, if the pH of said drinks is not much lower than the iso-electric point of casein, casein is precipitated. For this reason the amount of Lactobacilli must be large enough so that the cultivating period is between 6 to 9 days. However, the number of living Lactobacilli is at a maximum in 2 to 3 days and then decreases rapidly thereafter, therefore the combination of high acidity and a high amount of bacilli was hard to obtain heretofore; but by using the promoting material of this invention it is possible to make Lactobacilli-drinks with sufficient lactic-acidity and a sufficient number of living bacilli in 2 to 3 days.

As explained above, by using the Lactobacilli promoting material which is obtainable from Chlorella, not only lactic acid but also living Lactobacilli can be produced in great quantities in a short time, therefore, it is possible to make Lactobacilli drinks with a large number of Lactobacilli in a short time and also very economically.

The following examples illustrate the invention.

*Example I*

20 grams of Chlorella in the form of a dry powder is added to 100 cc. N/20 hydrochloric acid and allowed to stand at 37° C. for 24 hours and filtrated to remove the alga. It is possible to use this filtrate, which has a pH of about 1.8, but for use in making Lactobacilli drinks, it must be refined. This is done by adding 2 to 5 grams of activated carbon to said filtrate and stirring well for about 20 minutes so that the carbon will absorb the impurities. The filtrate is then neutralized by adding caustic soda. Another method for refining the filtrate is to add caustic soda to the filtrate until its pH is 9. 1 to 2 grams of activated carbon is added and stirred for 20 minutes to absorb the effective material from the filtrate. The carbon is then filtered out of the solution and placed into 100 cc. of N/20 hydrochloric acid. This mixture is then stirred for 20 minutes so that said effective material is removed from the carbon. The solution is then filtered to remove the carbon and the filtrate is neutralized by caustic soda.

*Example II*

To a cultivating medium which consists of molasses or glucose, crude amino acid and calcium carbonate; 0.2 to 0.5% of Chlorella is added in the form of a dry powder. The mixture is then sterilized by heating. *Lactobacillus delbrueckii* is inoculated into said mixture and the whole is cultivated at 50° C. in order to prevent propagation of miscellaneous bacteria. Lactic acid is obtained faster and greater than by the usual methods.

*Example III*

The following illustrates the manufacture of living Lactobacilli for the purpose of making medicine, 0.5 to 1.0% of the effective material obtained from Chlorella by dilute hydrochloric acid as explained in Example I is added to a cultivating medium which consists of 1% extract of meat, 1% peptone, 2% glucose and 2% precipitated calcium bicarbonate. The pH of the above medium is adjusted to 6.5 and sterilized by heating. Suitable Lactobacilli for medicine manufacture, e.g. *Lactobacillus acidophilus* or *Streptococcus faecalis*, is inoculated therein and the whole is cultivated at 37° C. In this manner a large amount of Lactobacilli is obtained in a short time. The living bacilli are then separated by a centrifuge and the living bacilli are made into a powder by the vacuum drying method.

*Example IV*

The promoting material which is obtained by Example I is added to a medium which consists of 14% skim powder milk and 4% glucose in the amount to make the concentration of Chlorella from 0.2 to 0.5%. The medium is then sterilized by heating, inoculated with *Lactobacillus acidophilus* and cultivated at 37° C. The cultivation which usually takes 6–9 days is completed in 2–3 days. When the above cultivating medium forms a curd, it is homogenized to crush it. 800 cc. of the so obtained medium is then added to 200 cc. of syrup which consists of the following recipe:

| | | |
|---|---|---|
| Cane sugar | grams | 150 |
| Cyclohexyl sodium sulfamide | do | 3 |
| Saccharin | do | 0.3 |
| Spices or flavor | cc | 2 |

Total amount should be 200 cc.

The above syrup is only one of many that can be used. As a matter of fact, any syrup can be used that improves the taste and flavor of Lactobacilli drinks. It is best to dilute the syrups with water in the amount of 2.5 times that of the syrup.

We claim:

1. A method of cultivating Lactobacilli which consists essentially of incorporated powdered single cell agla selected from the group consisting of Chlorella and Scenedesmus into a cultivated medium containing skim milk powder and dextrose, sterilizing the mixture by heating, inoculating Lactobacillus into the sterilized medium, and cultivating at 37° C. until the desired concentration of lactic acid has accumulated.

2. A method according to claim 1, wherein the Lactobacillus is *Lactobacillus acidophilus*.

3. A method of cultivating Lactobacilli which consists essentially of incorporating the Lactobacillus growth-promoting component of single cell alga selected from the group consisting of Chlorella and Scenedesmus into a cultivating medium containing skim milk powder and dextrose, sterilizing the mixture by heating, inoculating Lactobacillus into the sterilized medium, and cultivating at 37° C. until the desired concentration of lactic acid has accumulated, the said growth-promoting component consisting essentially of the dilute hydrochloric acid extract of the said alga.

4. A method according to claim 3, wherein the alga is Chlorella and the bacillus is *Lactobacillus acidophilus*.

5. A method of cultivating Lactobacilli which consists essentially of incorporating the Lactobacillus growth-promoting component of single cell alga selected from the group consisting of Chlorella and Scenedesmus into a cultivating medium containing skim milk powder and dextrose, sterilizing the mixture by heating, inoculating Lactobacillus into the sterilized medium, and cultivating at 37° C. until the desired concentration of lactic acid has accumulated, the said growth-promoting component consisting essentially of the dilute hydrochloric acid extract of the said alga, which component has then been absorbed onto active carbon at a pH of 1.8 to 9, and then recovered from the active carbon by treatment with dilute hydrochloric acid followed by neutralization of the so-obtained percolate.

6. A method according to claim 5, wherein the alga is Chlorella and the bacillus is *Lactobacillus Acidophilus*.

7. The method of promoting the growth of Lactobacillus which consists essentially of cultivating the said Lactobacillus in a Lactobacillus-cultivating medium in the presence of added growth-promoting component of single cell alga selected from the group consisting of Chlorella and Scenedesmus.

8. The method according to claim 7, wherein the said component is present in whole powdered single cell alga.

9. The method according to claim 7, wherein the said component is present in the form of extract from the single cell alga.

10. A method of recovering Lactobacillus growth-promoting component from single cell alga selected from the group consisting of Chlorella and Scenedesmus which comprises the step of extracting the said component by means of dilute hydrochloric acid.

11. A method of recovering and refining Lactobacillus growth-promoting component from single cell alga which comprises extracting dry Chlorella powder with N/20 hydrochloric acid by percolation at 37° C. for 24 hours, and then filtering the percolate liquid to remove residual alga.

12. A method according to claim 11, comprising the further steps of stirring the percolate with active carbon at pH 1.8, filtering off the percolate from the carbon, and neutralizing the filtrate with caustic alkali solution.

13. A method according to claim 11, comprising the further steps of adjusting the pH of the percolate to about 9 with caustic alkali, stirring the percolate at said pH with active carbon, filtering, stirring the active carbon with the growth-promoting component absorbed thereon in N/20 hydrochloric acid whereby the said component is extracted, acid neutralizing the obtained extract with caustic soda.

14. A method for the production of lactic acid which comprises incorporating into a cultivating medium containing a member selected from the group consisting of molasses and glucose, amino acid and calcium carbonate, dry powdered Chlorella in amount of 0.2 to 0.5% by weight relative to the medium, heating to sterilize the mixture, inoculating with Lactobacillus, and cultivating the medium at 50° C.

15. A method according to claim 14, wherein the Lactobacillus is *Lactobacillus delbrueckii*.

16. A method for the production of Lactobacilli which comprises incorporating neutralized N/20 hydrochloric acid Chlorella percolate into a cultivating medium containing 1% of meat extract, 1% of peptone, 2% of glucose and 2% of calcium carbonate, the concentration of Chlorella being 0.5 to 1.0%, adjusting the pH of the medium to 6.5, sterilizing the medium by heating, inoculating with Lactobacillus and cultivating at 37° C., and recovering the accumulated Lactobacillus.

17. A method according to claim 16, wherein the Lactobacillus is *Lactobacillus acidophilus*.

18. A method according to claim 16, wherein the Lactobacillus is *Streptococcus faecalis*.

References Cited in the file of this patent

UNITED STATES PATENTS

| | | |
|---|---|---|
| 1,249,511 | Saxe | Dec. 11, 1917 |
| 1,485,844 | Fred et al. | Mar. 4, 1924 |
| 1,838,599 | Wells | Dec. 29, 1931 |
| 2,697,663 | Tomarelli et al. | Dec. 21, 1954 |
| 2,708,165 | Gyorgy et al. | May 10, 1955 |
| 2,710,806 | Gyorgy et al. | June 14, 1955 |
| 2,710,807 | Gyorgy et al. | June 14, 1955 |
| 2,811,450 | Petuely | Oct. 29, 1957 |